United States Patent [19]

Agrawal

[11] 4,287,161
[45] Sep. 1, 1981

[54] METHOD FOR DEFOAMING IN GAS PURIFICATION SYSTEMS

[75] Inventor: Jagdish M. Agrawal, Sterling Heights, Mich.

[73] Assignee: Michigan Consolidated Gas Company, Detroit, Mich.

[21] Appl. No.: 132,685

[22] Filed: Mar. 21, 1980

[51] Int. Cl.³ .................. B01D 53/34; B01D 19/02
[52] U.S. Cl. .................................. 423/229; 55/48; 55/56; 55/87; 55/178; 210/664; 210/694
[58] Field of Search .............. 55/48, 56, 73, 85, 178, 55/87; 423/228, 229; 210/40, 74, 253, 295, 663, 694, 806, 664

[56] References Cited

U.S. PATENT DOCUMENTS

| | | | |
|---|---|---|---|
| 1,944,122 | 1/1934 | Fife | 423/229 |
| 2,380,139 | 7/1945 | Ambler | 210/74 |
| 2,544,564 | 3/1951 | Peterson et al. | 423/229 |
| 2,701,750 | 2/1955 | Paulsen et al. | 423/229 |
| 3,098,705 | 7/1963 | Bally | 423/229 |
| 3,436,344 | 4/1969 | Canning et al. | 210/39 |
| 3,535,263 | 10/1970 | Singh | 252/192 |
| 3,568,405 | 3/1971 | Perry | 55/32 |
| 4,072,480 | 2/1978 | Wagner | 55/73 |
| 4,083,701 | 4/1978 | Noack | 55/20 |

FOREIGN PATENT DOCUMENTS

1950603 4/1971 Fed. Rep. of Germany ........... 423/228

*Primary Examiner*—David L. Lacey
*Attorney, Agent, or Firm*—Harness, Dickey & Pierce

[57] ABSTRACT

Disclosed is the method of defoaming an aqueous amine gas purification scrubbing solution by stripping gaseous contaminants from the scrubbing solution and then passing a side stream of from about 10% to about 20% of the scrubbing solution through a carbon filter.

2 Claims, 1 Drawing Figure

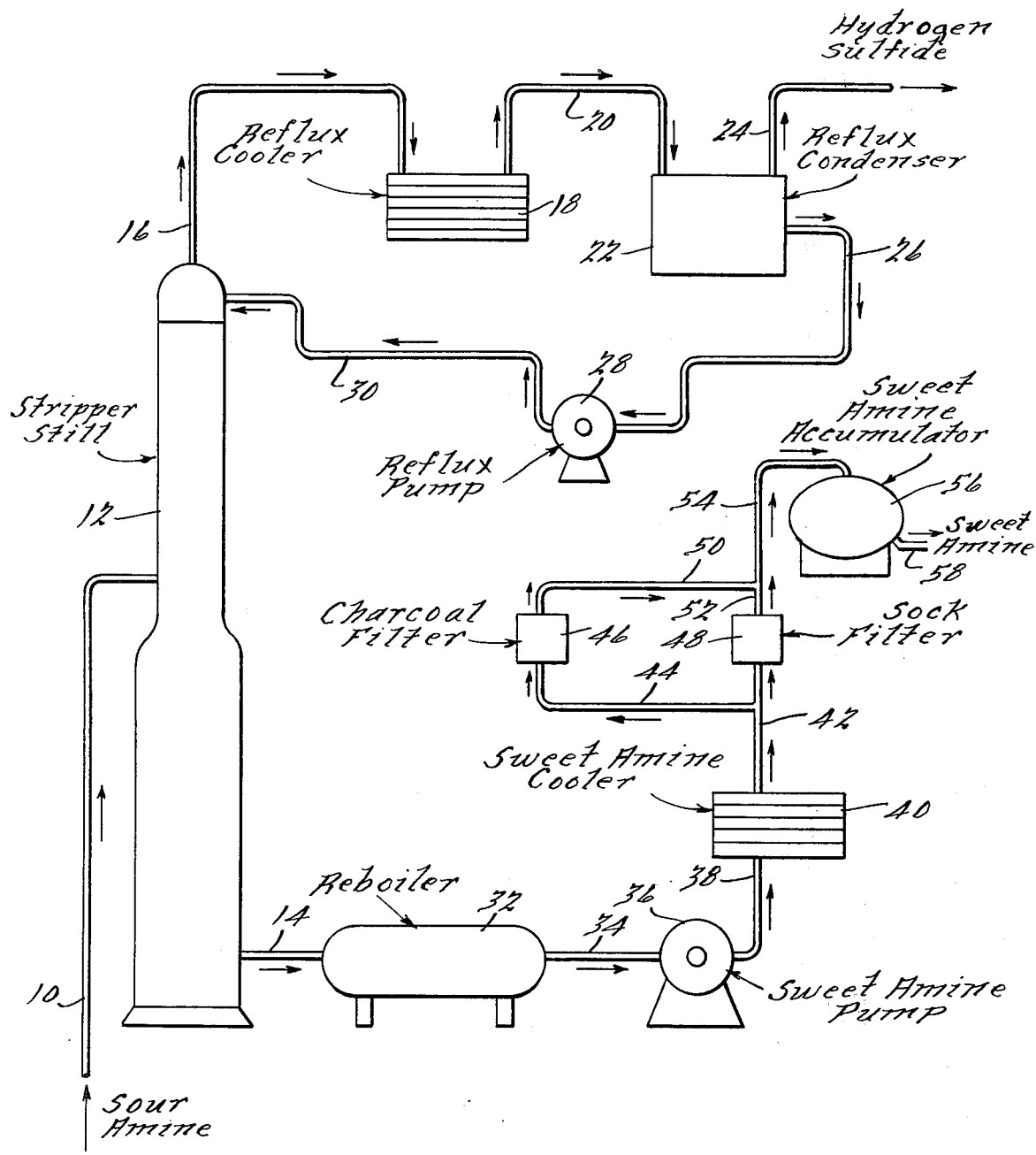

METHOD FOR DEFOAMING IN GAS PURIFICATION SYSTEMS

BACKGROUND AND SUMMARY OF THE INVENTION

The present invention relates to a method for defoaming gas purification scrubbing liquids such as are commonly used in the purification of natural gas.

Foaming of the stripping or scrubbing liquid is a problem encountered in various gas purification, fractionation, stripping and similar operations. For example, in a typical natural gas purification system, the gas is passed counter-currently through a scrubbing solution, typically an aqueous ethanolamine solution, in an absorption column wherein hydrogen sulfide and other contaminants are removed from the gas by the scrubbing solution. The hydrogen sulfide and other contaminants are then separated from the scrubbing solution by a stripper still and a sock filter to thereby regenerate the scrubbing solution so that it can be again used to scrub the natural gas. The scrubbing solution is thus used in a cyclical manner. Unfortunately, in many cases contaminants build up in the scrubbing solution and cause the solution to foam.

Foaming of the scrubbing solution is very disadvantageous. Efficient scrubbing of the natural gas by the scrubbing liquid is dependent upon the gas phase being in contact with the liquid phase and foaming of the liquid phase results in reduced contact therebetween. Also, foam in the upper portion of the stripper still increases the pressure drop across the inlet and outlet streams of the scrubbing solution into and out of the still. This results in low hydraulic gradient, downflow flooding, weeping, entrainment flooding, and lower overall column efficiency as well as reduced absorption and contacting of gas and liquid phases. Furthermore, heavy foaming results in loss of scrubbing solution through the top of the stripper still and can quickly result in shutdown of the operating unit and consequent loss of production.

Foaming is enhanced by the presence of heat and low pressure in the stripper still. Unfortunately, the emulsions and foam-forming compounds built up in the scrubbing solution can provide very stable foams and although various defoaming agents such as vegetable and mineral oils and silicon compounds can be added to the solution in an attempt to control foaming, the amount of foaming encountered in some gas purification systems is so heavy that such defoaming compounds are not effective.

Wherefore, it is an object of the present invention to provide a method for controlling foaming of a gas scrubbing solution used in gas purification systems. The method of this invention relates to a gas purification system wherein an aqueous amine scrubbing solution is employed to remove contaminants such as hydrogen sulfide from the gas and then the scrubbing solution is regenerated by separating the contaminants therefrom so that the scrubbing solution can be employed in a cyclical fashion. In accordance with the method of the present invention, after the stripper still, the main stream of scrubbing solution is divided into a major stream and a minor stream; the major stream being passed through a conventional sock filter while the minor stream is passed through a side stream filter of activated charcoal.

BRIEF DESCRIPTION OF THE DRAWING

The FIGURE is a flow diagram illustrating the method of the present invention for controlling foaming of scrubbing solution used in a gas purification system.

DESCRIPTION OF THE INVENTION

The method of the present invention for defoaming a gas scrubbing solution is illustrated by the flow diagram of the accompanying drawing. The drawing illustrates the process wherein sour amine is regenerated to sweet amine in accordance with the present invention. Typically, sour amine is an amine scrubbing solution which has been passed counter-currently to natural gas to remove hydrogen sulfide and other contaminants therefrom. Sweet amine is the amine scrubbing solution which has been regenerated so as to be again ready for use as a scrubbing liquid.

Now referring to the drawing, sour amine, i.e. contaminated scrubbing solution, such as might be obtained from a conventional gas purification absorption column, is fed through conduit 10 into a stripper still 12. In stripper still 12, hydrogen sulfide and other acidic materials in the scrubbing solution are separated from the amine scrubbing solution in a conventional manner with hydrogen sulfide, water vapor and other gasses passing through the top of stripper still 12 into conduit 16 and amine scrubbing solution accumulating in the bottom of stripper still 12 to be withdrawn therefrom through conduit 14.

The gaseous materials such as hydrogen sulfide and water vapor pass through conduit 16 into reflux cooler 18, and then through pipe 20 into reflux condensor 22 wherein gaseous hydrogen sulfide and the like are separated from the water vapor and are vented through pipe 24 while the water vapor is condensed to be pumped through conduits 26 and 30 by reflux pump 28 to be returned to stripper still 12 to serve as liquid reflux therefor and as makeup water for the system. Stripper still 12 as well as the aforementioned processing of the gaseous materials separated from the scrubbing solution is conventional and well known in the art.

The amine scrubbing solution in the bottom of stripper still 12 is withdrawn through conduit 14 into reboiler 32 and then is pumped through conduits 34 and 38 by sweet amine pump 36 into sweet amine cooler 40. From sweet amine cooler 40, the amine solution, under pressure from pump 36, passes into conduit 42 which is in fluid communication with conduit 44. In accordance with the present invention, conduit 44 serves to divert a side stream from the main stream of scrubbing solution flowing through conduit 42. Thus, the stream of amine scrubbing solution is divided into a minor portion which flows through conduit 44 and charcoal filter 46 and a major portion which flows through sock filter 48. From charcoal filter 46, the minor portion of scrubbing solution passes through conduit 50 to rejoin the major portion of scrubbing solution which flows outwardly from sock filter 48 through conduit 52. The stream of scrubbing solution then flows through common header conduit 54 to the sweet amine accumulator 56. From sweet amine accumulator 56 the sweet amine solution is pumped through pipe 58 for reuse in an absorption column or the like to purify a contaminated gas in a conventional manner.

Thus, in accordance with the method of the present invention, an aqueous amine scrubbing solution which is cyclically employed to remove contaminants such as hydrogen sulfide and the like from gas, is passed into a stripper still or the like, wherein gaseous contaminants are separated from the scrubbing solution, and then is divided into a major stream and a minor stream, the minor stream passing through a charcoal filter. The minor stream comprises from about 10% to about 20% (by volume) of the flow of scrubbing solution. It is also desirable to pass either the entire stream of scrubbing solution or the major stream thereof through a conventional sock filter. Thus, in accordance with the present invention, the charcoal filter and sock filter can be installed in a parallel manner so that from about 10% to about 20% of the scrubbing solution is filtered by the charcoal filter and from about 90% to about 80% of the solution is filtered by the sock filter. Preferably, about 12% of the scrubbing solution is passed through the charcoal filter. For a minor stream flow rate of about 24 gallons per minute of diglycolamine scrubbing solution, the charcoal filter suitably has, for example, an activated charcoal of 10 mesh size charcoal granules, providing a surface area of about 75 square feet, i.e. roughly 3 square feet per gallon.

While it is not wished to be limited to any specific theory, it is believed that the problem of foaming in gas scrubbing solutions caused by the production of foam forming compounds in the scrubbing solution is a result of chemical reactions which occur in the solution during its use. Foam forming compounds are believed to be continuously produced in the cyclically employed solution and build up to cause more and more foaming. For example, where a diglycolamine aqueous scrubbing solution is employed, it is believed that the diglycolamine degrades into carboxylic acids by reacting with carbon dioxide and carbonyl sulfide which have been absorbed while purifying the gas in the gas absorption system. These carboxylic acids are non-regenerable in nature under the operating conditions of temperature and pressure employed in the gas purification system and continue to increase in concentration in the scrubbing solution. These carboxylic acids react with compounds having alcohol moieties including diglycolamine itself to generate esters. The esters can then react with alkali hydroxides in the system to form soap and glycerides; and, of course, the soaps in the aqueous scrubbing solution produce foaming under the turbulent conditions in the gas purification system.

It is believed that the charcoal filter prevents excessive build up of the foam forming products in the scrubbing solution, such as the soapy compounds mentioned hereinabove, and removes emulsifying compounds generated in the system. The charcoal filter selectively absorbs carboxylic acids and esters while passing through the diglycolamine scrubbing solution. Furthermore, in accordance with the present invention, only a small portion of the main stream of absorption or scrubbing liquid is passed through the carbon filter, thus providing advantages with regard to expense of carbon material for the filter, and reduces loading on the system filters. Surprisingly, although only a small portion of the main stream is passed through the charcoal filter, foaming is effectively controlled by the present method. Thus, the present invention does not employ defoaming agents, which can be expensive and are of limited effectiveness, but rather effectively controls foaming in the system by filtering the solution. Furthermore, the filtering arrangement is economical and does not significantly interfere with the flow of scrubbing solution or the operation of the system. The advantages of the method of the present invention will be readily appreciated by those skilled in the art who have had to deal with the foaming problem in similar systems under the economic restraints common to gas purification systems. By employing the method of the present invention, the gas purification system can be operated for an extended period of time without shut down or other problems attendent to excessive foaming.

It will, of course, be apparent to those skilled in the art that once having benefit of the foregoing disclosure of the present invention, various modifications can be made or followed without departing from the spirit or scope of the present invention as set forth in the following claims.

What is claimed is:

1. In a method for purifying a gaseous mixture by removing contaminants therefrom with an aqueous ethanolamine scrubbing solution, the method of defoaming and regenerating the scrubbing solution comprising the steps of sequentially:
   (a) separating gaseous contaminants from said scrubbing solution by passing said scrubbing solution through a stripper still;
   (b) cooling said scrubbing solution;
   (c) dividing said scrubbing solution into a major stream and a minor stream, said minor stream comprising from about 10% to about 20% of flow by volume of said scrubbing solution;
   (d) passing said minor stream through an activated charcoal filter; and
   (e) combining said minor stream and said major stream to provide a regenerated scrubbing solution.

2. The method of claim 1 wherein said major stream is passed through a sock filter;
   said minor stream comprises about 12% of said scrubbing solution;
   said charcoal filter has a charcoal surface area of about 3 square feet per gallon of flow therethrough; and
   said aqueous ethanolamine scrubbing solution comprises diethanolamine.

* * * * *